United States Patent [19]

Young

[11] Patent Number: 4,896,701
[45] Date of Patent: Jan. 30, 1990

[54] UNDERGROUND PIPE SUPPORT AND SPACER

[76] Inventor: Donald W. Young, P.O. Box 15947, Durham, N.C. 27704

[21] Appl. No.: 236,506

[22] Filed: Aug. 25, 1988

[51] Int. Cl.⁴ ............................................. F16L 3/10
[52] U.S. Cl. .................................. 138/108; 138/111; 138/113; 138/114; 138/178
[58] Field of Search ............... 138/111, 108, 103, 113, 138/114, 148, 149, 178; 174/28, 99 R; 166/241; 175/325

[56] References Cited

U.S. PATENT DOCUMENTS

| | | | |
|---|---|---|---|
| Re. 23,545 | 9/1952 | Bond | 138/65 |
| 268,860 | 12/1882 | Browell | 138/113 |
| 2,165,357 | 7/1939 | Emmert | 138/148 |
| 2,274,031 | 2/1942 | Bannon | 174/28 X |
| 2,331,136 | 10/1943 | Peterson | 174/28 |
| 2,706,496 | 4/1955 | Bond | 138/65 |
| 2,735,449 | 2/1956 | Grahame | 138/65 |
| 2,750,963 | 6/1956 | Bond | 138/65 |
| 2,761,525 | 9/1956 | Moss | 138/148 X |
| 2,896,669 | 7/1959 | Broadway et al. | 138/113 |
| 2,938,569 | 5/1960 | Goodrich | 138/113 X |
| 3,271,506 | 9/1966 | Martin et al. | 174/99 R |
| 3,286,015 | 11/1966 | Hildebrand et al. | 174/99 R |
| 3,782,452 | 1/1974 | Ceplon | 138/111 X |
| 4,033,381 | 7/1977 | Newman et al. | 138/113 |
| 4,415,762 | 11/1983 | Ponder | 174/28 |

FOREIGN PATENT DOCUMENTS 1665711 12/1970 Fed. Rep. of Germany ........ 174/28

Primary Examiner—James E. Bryant, III
Attorney, Agent, or Firm—Richard E. Jenkins

[57] ABSTRACT

An underground support device is provided for supporting an underground pipe or cable within the encasement sleeve of a horizontally bored hole. The support device includes a round collar having two resiliently spaced-apart ends which can be urged together to secure the device to the underground pipe or cable. A plurality of equidistantly spaced-apart and outwardly extending support legs are provided around the circumference of the collar which terminate in an elongate foot having opposing ends inclined inwardly toward the collar. Each foot extends generally parallel to the longitudinal axis of the collar and has a greater length than the longitudinal length of the collar to facilitate placement and support of an underground pipe or conduit within the encasement sleeve of the underground hole.

6 Claims, 2 Drawing Sheets

UNDERGROUND PIPE SUPPORT AND SPACER

TECHNICAL FIELD

The present invention relates to underground pipe supports and spacers and particularly to a device for supporting underground pipes and conduits within the steel casing of a horizontal bore beneath a road bed, railroad bed or the like.

BACKGROUND ART

In the construction of oil pipe lines, it is known to place the oil flow conducting pipe within an outer pipe casing and to electrically insulate the pipes from each other in order to reduce the power requirements when cathodic protection is applied to the pipe line to prevent corrosion. Numerous spacers and insulators have been designed to support the oil pipe within the outer casing including those disclosed in Bond U.S. Pat. No. Re. 23,545 and improvements thereto disclosed in U.S. Pat. Nos. 2,706,496 and 2,750,963. These patents generally teach the use of elongate spacer elements constructed of a dielectric material such as Bakelite and which are positioned around the circumference of the oil pipe with their longitudinal axes being parallel to each other as well as to the longitudinal axis of the oil pipe. The spacer elements are secured to the oil pipe by a pair of metal rods or cables which pass through the spacer elements and which are adapted so that tension can be applied thereto to secure the elements to the oil pipe.

Also of interest, Grahame U.S. Pat. No. 2,735,449 discloses an improved oil pipe spacing device wherein the elongate spacer blocks are provided with laterally extending bases which are contiguous to one another. A plurality of the spacer blocks may be connected together with a single connecting cable since each spacer block is braced by the bases of the two contiguous blocks so as to resist twisting when a lateral force is applied thereto. Thus, only a single connecting cable is required in order to provide a stable plurality of elongate spacer bars or blocks around the circumference of the oil pipe.

Also of interest, a support and spacer device is manufactured by Cascade Company of Yorkville, Ill., for use in supporting pipes and the like within the encasement of a horizontal bore. The device is constructed of two semi-circular half sections which are bolted together at the opposing sides thereof. A pair of dielectric spacer bars are provided at the top and at the bottom of the device, but the distance between the two spacer blocks at the top and the two spacer blocks at the bottom of the device is substantially less than the distance between a corresponding top block and bottom block. Thus, one shortcoming of the device when secured to an underground pipe is that the vertical spacing of the pipe above the encasement will decrease if the support and spacing device is caused to rotate within the steel casing. Also, the complexity of securing the two half sections together with the requisite plurality of bolts required therefore renders the support and spacer device as a less than satisfactory device in many underground pipe and cable support applications.

Thus, although devices designed specifically for the support of underground oil pipes as well as devices designed more generally for the support and spacing of underground pipes or the like are known, applicant believes that all suffer deficiencies and shortcomings in use that have been overcome by the improved device of the present invention for underground support of water, sewer and gas pipes as well as electrical and phone conduits and the like.

DISCLOSURE OF THE INVENTION

In accordance with the present invention, applicant provides an improved device for supporting an underground pipe or cable within the steel encasement of a laterally bored hole beneath a road bed, railroad bed or the like. The device comprises an annular collar having two adjacent ends which are resiliently spaced-apart and which each terminate in an outwardly extending ear. A bolt extends between the ears which can be tightened in order to urge the ears into contact so as to secure the collar around the pipe or cable desired to be supported. A plurality of circumferentially equally spaced-apart support legs are secured to the collar, and each leg has an elongate foot secured to the outer end thereof which extends generally parallel to the longitudinal axis of the collar and has a greater length than the longitudinal length of the collar. The opposing ends of the foot on each of the plurality of support legs are inclined inwardly toward the collar to facilitate placement of the pipe or cable into the steel casing of a laterally bored hole.

It is therefore the object of this invention to provide a device for supporting an underground pipe or cable or the like within the steel casing of a laterally bored hole which eliminates the problems of previously known devices described above.

More specifically, it is the object of the present invention to provide a device for supporting an underground pipe or cable or the like which is easier to secure to the pipe or cable and which is more stable and durable than devices known heretofore.

It is another object of the present invention to provide a device for supporting an underground pipe or cable or the like which maintains a constant spacing between the casing of an underground horizontally bored hole and the pipe therein when the pipe is rotated within the casing.

Some of the objects of the present invention having been stated, other objects will become evident as the description proceeds, when taken in connection with the accompanying drawings.

BEST MODE FOR CARRYING OUT THE INVENTION

Figure 1:
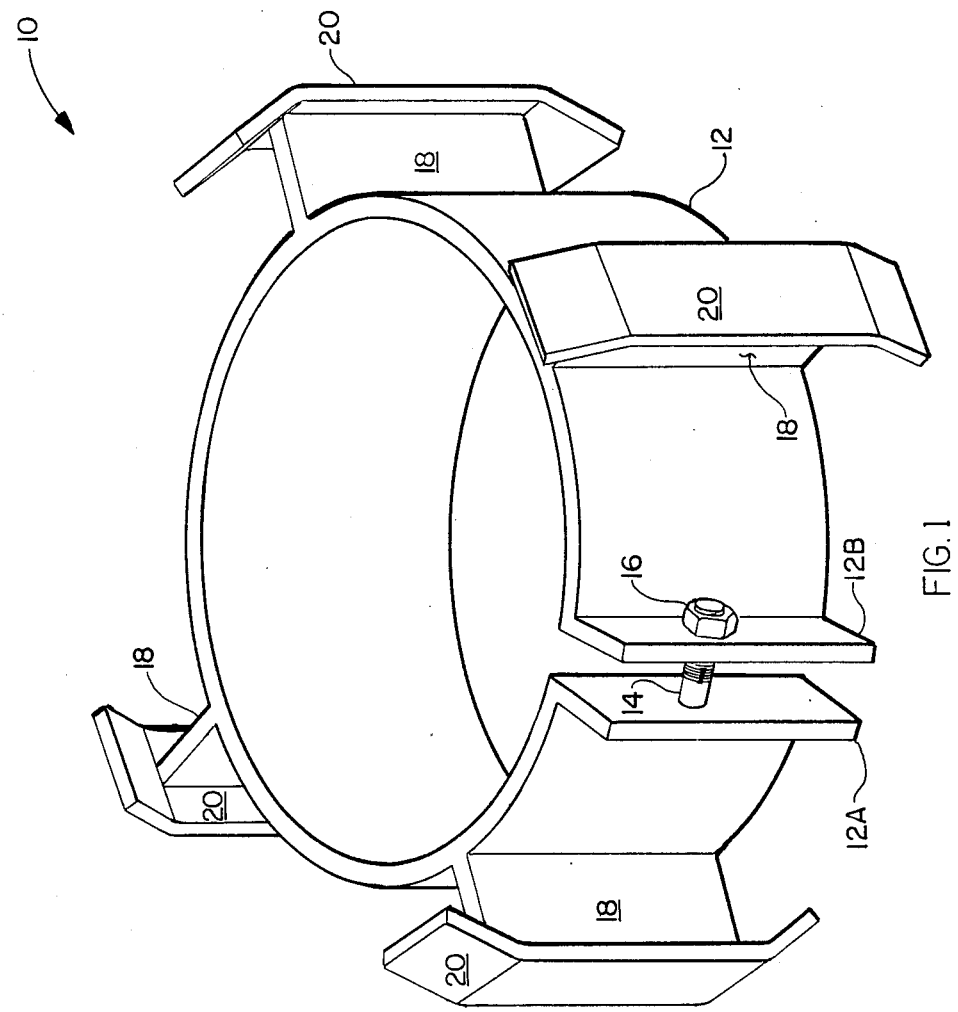
FIG. 1 is a perspective view of the device of the present invention.

Referring now more specifically to the drawings, a preferred embodiment of an underground pipe or cable support device is shown in FIG. 1 and generally designated 10. Support device 10 comprises a round collar 12 having upturned ears 12A, 12B at the top of collar 12. The ears 12A, 12B are normally resiliently spaced-apart so as to facilitate sliding placement of support device 10 on an underground pipe or cable. A bolt 14 extends between ears 12A, 12B and has a nut 16 threaded thereon which may be tightened so as to urge ears 12A, 12B into contact and thereby secure collar 12 of support device 10 to a desired location along the length of a pipe or cable.

Support device 10 includes four support legs 18 which are equidistantly spaced-apart around the circumference of collar 12 and which extend radially outwardly therefrom. Support legs 18 are preferably constructed with a length which is substantially coextensive with the length of collar 12 in the direction of its longitudinal axis. A foot 20 is secured to the outer end of each support leg 18 and serves as a skid when a pipe having one or more of support devices 10 secured thereto is inserted into a steel encasement sleeve of a laterally extending hole of the type bored beneath highway and railroad beds in order to accommodate water, sewer and gas pipes as well as electrical and phone cable conduits.

Looking more closely at feet 20 of support device 10, it can be seen that each foot 20 possesses a generally elongate shape and extends parallel to the longitudinal axis of collar 12, and that each foot 20 extends beyond the front and back edge of collar 12. In other words, each foot 20 is of a greater longitudinal length than the longitudinal length of collar 12. This relatively long length of each foot 20 serves to provide enhanced stability for support of an underground cable within the steel encasement sleeve of an underground bore. Finally, it should be specifically pointed out that each foot 20 includes a front and rear portion which is inclined inwardly toward collar 12 in order to further enable foot 20 to serve as an effective skid during placement of an underground cable, conduit or the like within the encasement sleeve of a laterally bored hole. Although other configurations are possible and within the scope of the present invention, the preferred embodiment thereof contemplates that each foot 20 is of an equal length to the others.

Support device 10 is most preferably constructed entirely of heavy duty steel which is primed and then coated with a painted, galvanized or asphalt finishing coat thereover. Support legs 20 are welded directly to collar 12 and feet 20 are welded to support legs 18, although other securement techniques are contemplated by the invention. Support device 10 may be constructed with varying diameter collars 12 and with support legs 18 and feet 20 of various sizes since the dimensions of support device 10 are determined by the size of the encasement sleeve of an underground hole and the diameter of the pipe or conduit to be placed into and supported therein by support device 10. The dimensions of a typical support device 10 intended to support an 8 inch water pipe in a 16 inch diameter steel encasement are set forth in Table 1 below.

TABLE 1

| | |
|---|---|
| Diameter of Collar | 9.5 inches |
| Width of Collar | 4.0 inches |
| Number of Support Legs | 4 |
| Height of Support Legs | 2.5 inches |
| Length of Support Legs | 4.0 inches |
| Distance Between Support Legs | 7.5 inches |
| Length of Feet | 6.0 inches |

Figure 2:
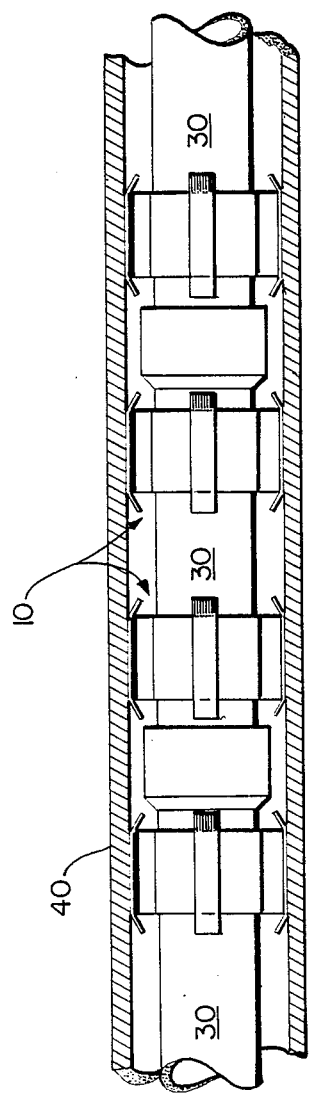
FIG. 2 is a longitudinal view, partly in section, showing a plurality of the devices of the present invention in place on an underground pipe.

In operation, it can be seen with reference to FIG. 2 that support devices 10 are secured to underground pipes 30 in spaced-apart locations along the length thereof so as to facilitate placement of pipes 30 within encasement 40, most typically a steel encasement sleeve, and support of pipes 30 once properly positioned within encasement 40. Most suitably, support devices 10 are constructed so that when placed into encasement 40 all of feet 20 of support devices 10 will either be in contact with or in close proximity to the inside surface of encasement 40. This provides for greater stability in placement and support of pipes 30 therein. This, of course, is accomplished by constructing support device 10 with dimensions which assure that collar 12 will snugly engage pipe 30 when nut 16 is tightened onto bolt 14, and that support legs 18 will position feet 20 in close proximity or into contact with the inside surface of encasement 40.

It will be understood that various details of the invention may be changed without departing from the scope of the invention. Furthermore, the foregoing description is for the purpose of illustration only and not for the purpose of limitation—the invention being defined by the claims.

What is claimed is:

1. A metal device for supporting an underground pipe or cable within the encasement sleeve of a laterally bored underground hole comprising an annular collar having two adjacent ends resiliently spaced-apart and adapted to be urged together so as to secure said collar around the underground pipe or cable, a plurality of support legs equidistantly spaced apart and extending radially outwardly from said collar, said support legs each having means attached to the end thereof to facilitate placement of the pipe or cable into the encasement sleeve of the laterally bored hole, said means comprising an elongate foot at the outer end thereof which is substantially longer than the longitudinal length of said collar, and wherein a medial portion of said foot is flat and the opposing ends of said foot are bent inwardly from the longitudinal axis of said foot toward said collar and out of the plane of the medial portion of said foot.

2. A device according to claim 1 wherein said device is constructed of steel.

3. A device according to claim 1 wherein said annular collar is round.

4. A device according to claim 1 wherein said two adjacent ends of said collar comprise outwardly extending ears having a bolt extending therebetween for urging said ears together and securing said collar to the underground pipe or cable.

5. A device according to claim 1 wherein said plurality of support legs consists of four legs equally spaced-apart around the circumference of said collar.

6. A metal device for supporting an underground pipe or cable within the encasement sleeve of a laterally bored underground hole comprising a round collar having two adjacent ends resiliently spaced-apart and each end terminating in an outwardly extending ear, a bolt extending between said ears for urging said ears together so as to secure said collar around the underground pipe or cable, four equidistantly spaced-apart support legs extending radially outwardly from said collar, said support legs each having means attached to the end thereof to facilitate placement of the pipe or cable into the encasement sleeve of the laterally bored hole, said means comprising an elongate foot at the outer end thereof which is substantially longer than the longitudinal length of said collar, and wherein a medial portion of said foot is flat and the opposing ends of said foot are bent inwardly from the longitudinal axis of said foot toward said collar and out of the plane of the medial portion said foot.

* * * * *